United States Patent [19]
Splitt et al.

[11] 3,958,921
[45] May 25, 1976

[54] MULTIPLE CHAMBER HEATING UNIT

[75] Inventors: Hans-Richard Splitt; Adolf Scherf, both of Duisburg, Germany

[73] Assignee: Mannesmann Aktiengesellschaft, Dusseldorf, Germany

[22] Filed: Mar. 5, 1975

[21] Appl. No.: 555,693

[30] Foreign Application Priority Data
Mar. 7, 1974   Germany............................ 2411280

[52] U.S. Cl................................ 432/122; 432/128; 432/224; 432/225
[51] Int. Cl.² ...................... F27B 9/14; F27B 9/02
[58] Field of Search ........... 432/224, 225, 122, 124, 432/126, 128

[56]   References Cited
UNITED STATES PATENTS

| | | | |
|---|---|---|---|
| 2,153,958 | 4/1939 | Dunkak | 432/225 |
| 2,589,495 | 3/1952 | Hess et al. | 432/225 |
| 2,916,277 | 12/1959 | Hess | 432/122 |
| 3,620,513 | 11/1971 | Wernicke | 432/122 |
| 3,879,252 | 4/1975 | Vossen | 432/225 |

Primary Examiner—John J. Camby
Attorney, Agent, or Firm—Ralf H. Siegemund

[57]   ABSTRACT

The heating unit is constructed from two horizontally reciprocating parts having complementary recesses to define several, vertically stacked, cylindrical heating chambers, each with a central heating core extending from a common rear wall plate. The arrangement is movable in axial direction to receiving tube ends positioned in aligned and vertically stacked, horizontal position, in front of the heating chambers. Conveyor and transport facilities move tubes laterally in and out of these positions and cause each of them to be heated, in sequence, in all of the chambers.

5 Claims, 3 Drawing Figures

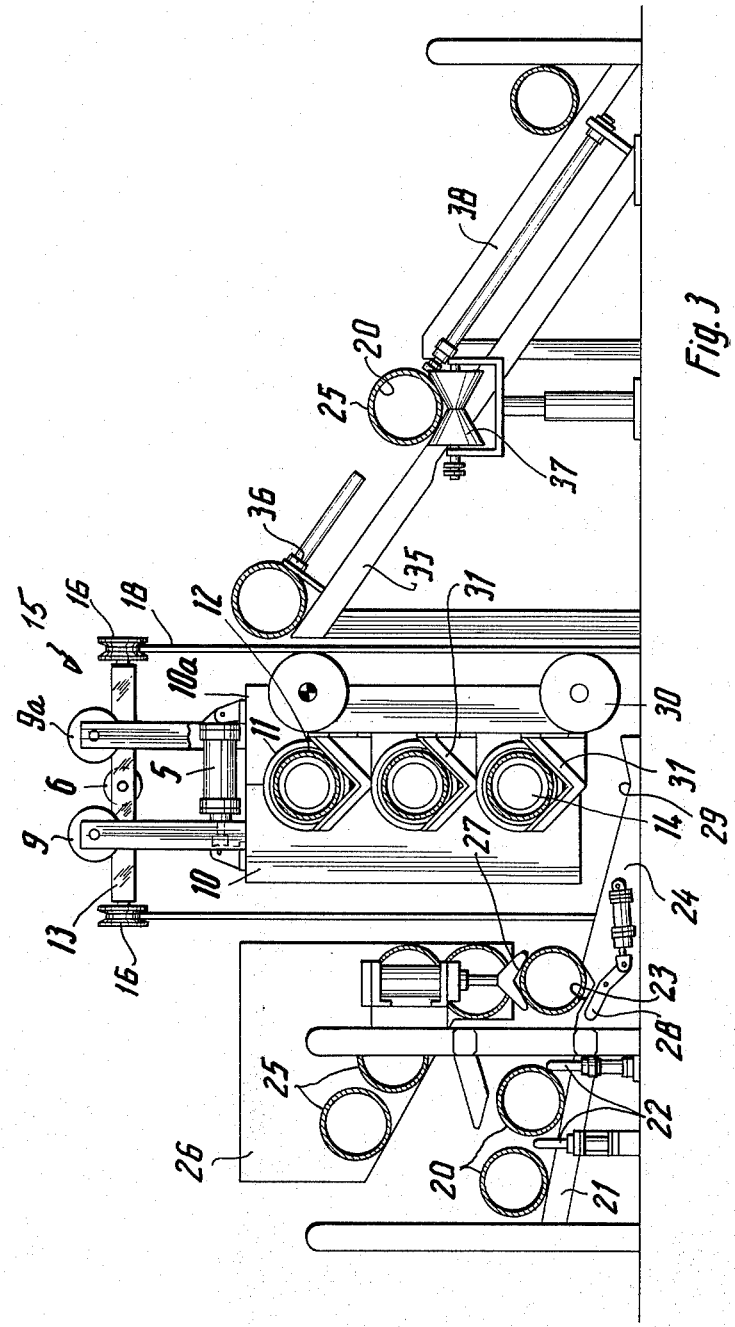

MULTIPLE CHAMBER HEATING UNIT

BACKGROUND OF THE INVENTION

The present invention relates to a multiple chamber heating unit for heating the ends of thermoplastic tubes.

The German printed patent application 2,136,315 (see also U.S. Pat. No. 3,879,252) describes equipment for applying a sleeve to a tube wherein the end of the tube is heated prior to applying the separately heated sleeve thereto. This known equipment is designed for heating the tube and the sleeve separately and pushing the heated sleeve onto the tube. It was found however, that for speedy and economic operation for example of a press tool which press works the sleeve-reinforced-tube end, one needs several, staggeredly-parallel operating units. Moreover, these units inherently require some clearance for tube insertion and retraction.

DESCRIPTION OF THE INVENTION

It is an object of the present invention to provide a new and improved equipment for heating tube ends which is particularly adapted for synchronized cooperation with subsequent press working. Moreover, the tube end should be uniformly heated and treated rather gently in the process.

In accordance with the preferred embodiment of the invention, it is suggested to provide a, basically, three part heating unit of which two parts are of complimentary contour for defining plural, cylindrical heating chambers but can be separated in a direction transverse to the cylinder axes. The third part constitutes the rear wall for the heating chambers in all instances and carries heating cores for insertion into the respective pipe ends which in turn are inserted into the chambers. The two complimentary parts reciprocate relative to each other and all three parts are mounted for transverse, i.e. axis parallel movement.

This multiple chamber unit is preferably constructed so that the chambers are vertically stacked. The unit cooperates with a transport system which sequentially and in steps places tubes in front of the reciprocating unit. A vertically arranged conveyor portion moves the tubes sequentially up, into alignment whereby for each conveyor strip the unit is retracted with spread apart complimentary part, while for heating the unit returns and the complimentary parts close. Each tube end passes sequentially through all heating chambers to be heated in steps. Thereafter, the transport system withdraws the tubes laterally for being moved e.g. to a press tool.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 is a view comparable with FIG. 1 but including additional equipment for applying sleeves to the tube's end and heating the combination.

Figure 2:
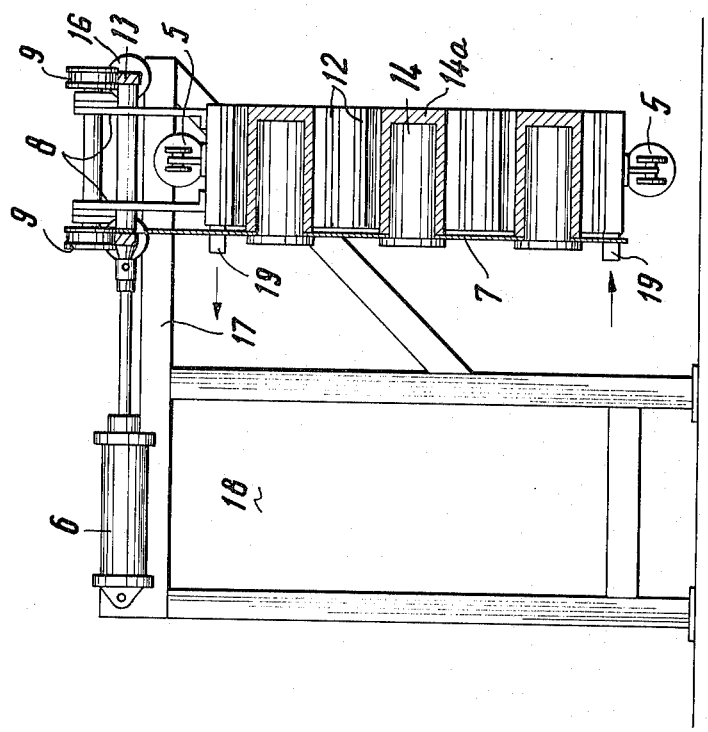
FIG. 2 is a section view taken along lines 2—2 in FIG. 1.
Figure 1:
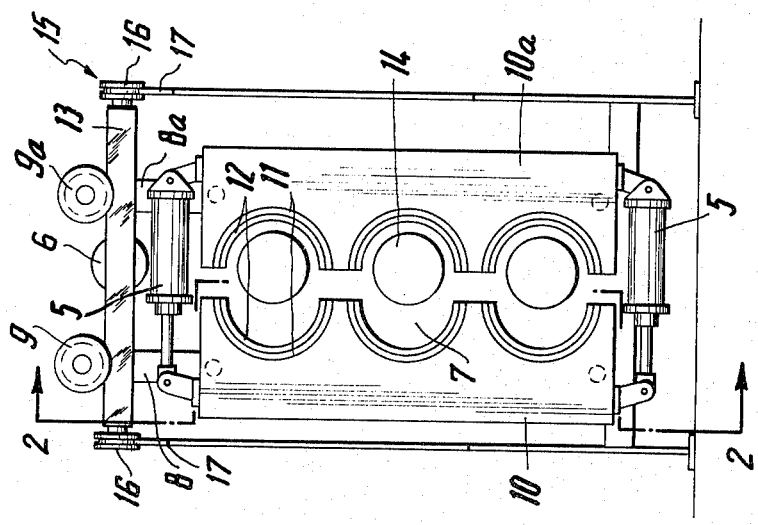
FIG. 1 is a front view of a multi-chamber heating unit in accordance with the preferred embodiment of the invention.

Proceeding now to the detailed description of the drawings, the heating unit has two complimentary portions 10 and 10a which may interface thereby forming cylindrical heating chambers upon complimentary disposition of recesses 11. These recesses respectively receive semicylindrical linings 12 whose inner diameter in each instance determines the chamber dimensions. This way, one can match the dimensions of the heating chamber to the outer diameter either of the end of a tube or of a sleeve to be inserted so as to obtain surface to surface engagement therewith.

The two parts 10 and 10a are suspended individually by means of frames 8, 8a in which are journalled pulleys or wheels 9, 9a running on rails 13. Each part (10 or 10a) has two such wheels 9 or 9a. These rails 13 pertain to a carriage 15 having wheels 16 which in turn run on the top part of a frame 18; this top part is constructed as rails 17.

The parts 10, 10a together define three, vertically stacked heating chambers, with horizontal cylindrical axes. Correspondingly, there are provided three central heating cores or inserts 14. These cores have adapter sleeves 14a whose wall thickness is selected so that the effective outer diameter of each such heating insert is adaptable to the inner diameter of tubes into which these heating cores will be inserted.

The heating units 14 are secured (rigid connection) to a plate 7 which constitutes the rear wall of the heating chambers, and that rear wall in turn is secured to carriage 15 and suspended therefrom.

A hydraulic drive 6 provides for reciprocating movement of the carriage 15 whereby rear wall 24 and parts 10, 10a move in unison to the left and to the right in the plane of the drawing of FIG. 2. Two additional hydraulic drives 5 provide for relative movement of the parts 10, 10a as suspended by frame parts 8 and 9a respectively, towards and away from each other while rollers 9, 9a roll on the rails 13. The rear wall 7 does not participate in that movement so that each heating chamber opens up while the respective heating core 14 stays in position.

As indicated with numerals 19, parts 10 and 10a are heated by means of heating fluid, e.g. oil circulating through the respective parts after entering and prior to being discharged as indicated by arrows. These connectors 19 connect to suitable tubes, preferably flexible ones to sustain the circulations of the heating fluid through the parts 10 and 10a. The heating cores 14 are preferably heated electrically.

Turning now to FIG. 3, the front view of the muliple heating chamber is shown again on a slightly reduced scale. In addition, the Figure shows various transport and conveyor equipment for cooperating with the multiple chamber unit. Tubes 20 arrive at an input section, on an inclined feeder part defined, for example, by obliquely positioned rails 21. Only one such rail is visible in the drawings, several will dispose parallel to each other and in planes above i.e. in front of the plane of the drawing of FIG. 3.

Vertically reciprocating, hydraulically operating stops 22 are disposed to hold the tubes 20 in waiting positions; the tubes are rolled down one by one and the final position of feeding in that section is arrived at when a tube 20 rests in bed defining notches 23 in another, continuing inclined roll path 24, also established by rails.

A hopper like feeder element 26 for sleeves 25 is provided somewhat to the rear of the tube feeding equipment. A reciprocating, hydraulically driven holding plunger 27 holds a tube 20 when in bed 23 while a sleeve 25 is pushed axially on the end of the tube 20 through equipment (not shown) in the rear, but being conventional for that kind of operation.

A hydraulically operated actuating arm 28 lifts a tube 20 with applied sleeve 25 onto the roll down path 24 to come at rest in bed portion 29 having a dispositon of vertical alignment with the heating chambers. The heating chambers, i.e. parts 10, 10a have been retracted (a position more to the left in FIG. 2), and the parts 10, 10a themselves have been driven apart.

A vertical conveyor facility 30 having endless chains with trough like holders 31 attached, moves these holders in up direction along the front portion of the heating chambers. Thus, such a holder 31 will grip a tube 20 when in bed 29 and moves it up and in front of the lowest heating chamber. The respective holder 31 above the first one mentioned holds a tube which was in alignment with the lowest heating chamber but is now moved up in front of the second or middle chamber, while another holder 31 moves a third tube into alignment with the highest heating chamber. For the sake of clarity the holders 31 have been shown only on their upwards path and as holding tubes; the holders along the down stringer of the conveyor facility 30 have been omitted.

It can readily be seen that the conveyor 30 moves in steps, each step being defined by the vertical center to center distance of the heating chambers from each other, and by the distance of the axis of the lowest chamber from the disposition a tube axis will have when in bed 29. Upon completion of a step movement the conveyor 30 stops and carriage 15 is moved forward (e.g. into the position shown in FIG. 2) so that the respective heating cores or elements 14 are inserted into the tube-ends. Following that positioning, the drives 5 move the parts 10, 10a towards each other so as to close the heating chambers by bringing the linings 12 into abutment with the respective sleeves 25 on the tube ends.

The tube ends with sleeves are now heated for a certain period of time, which is less than actually needed ultimately, whereupon parts 10, 10a are rolled apart to obtain better clearance and carriage 15 retracts whereupon conveyor 30 moves by another step to place a new tube into alignment with the lowest heating chamber; the previously lowest and middle tubes are moved respectively into alignment with the middle and upper heating chamber; and the upper tube is laterally moved (tilted) out of the way as the respective holder 31 turns along the upper wheel of the conveyor 30.

It can thus be seen that each tube with applied sleeve is heated in three steps. A tube having been heated 3 times and having now assumed sufficiently high temperature is moved out of the range of the heating unit and onto a lateral-inclined conveying facility (rails) 35. Reciprocating stops 36 may guide the down rolling of a tube 20 for gently placing it onto a roller track 37 moving the tube to the front or to the rear of the plane of the drawing for placement on another down path 38 for further transport to the press tool which integrates the sleeve with the tube.

It can thus be seen that the step wise heating permits a rather rapid sequencing of the tubes which will be moved to the press tool at a rather rapid rate. Also, the heating in steps is now matched to the rather rapid sleeve-to-tube application prior to heating.

It can readily be seen that the tube ends are heated and handled quite gently. Particularly, the step wise heating does not necessitate application of heat by means of engagement with excessively hot heating structure. The vertical stacking of heating permits considerable space saving and the apparatus can be readily integrated with a production line which includes an extruder e.g. for the sleeve and the subsequent working of the sleeve-reinforced tube ends. The apparatus is readily adaptable for integration in a fully automated production line and the various hydraulic drives, stop conveyors, etc. can be controlled e.g. through electrical control of valves etc. to obtain synchronized, automated operation.

FIG. 3 shows that tubes with applied sleeves are heated. Of course, the heating equipment can be used for heating tube ends without sleeve reinforcement, or the sleeves may have been applied at another time, for example, by equipment of the above identified patent.

The invention is not limited to the embodiments described above but all changes and modifications thereof not constituting departures from the spirit and scope of the invention are intended to be included.

We claim:

1. Multiple chamber heating unit for heating the end of tubes, comprising:

first and second parts of complimentary configuration to define a plurality of cylindrical heating chambers when in juxta-position, and being disposed for separation from each other;

means connected to the first and second parts for imparting upon them reciprocating movement for selectively placing them into juxta-position and separating them from each other; and means defining a rear wall for said chambers and carrying a plurality of heating elements respectively projecting into the cylindrical heating chambers from ends thereof adjacent said rear wall, a tube when inserted into a heating chamber being inserted from the other end thereof.

2. Multiple heating unit as in claim 1 and including a frame and carriage means running on said frame, said first and second parts and said rear wall being mounted to said carriage, the first and second parts being mounted for movement transverse to carriage movement on the frame, the rear wall being fixed to the carriage.

3. Multiple heating unit as in claim 1 and including means for placing tubes in front of the heating unit;

means for moving such tubes into axial alignment with the heating chambers adjacent said other ends thereof; and means for providing relative movement between tubes as so aligned and the heating unit.

4. Multiple heating unit as in claim 1 wherein each chamber is provided with a removable lining for adapting the effective diameter of the respective chamber to the outer diameter of a tube to be inserted.

5. Multiple heating unit as in claim 1 wherein the first and second parts reciprocate in a first horizontal direction, the heating chambers being vertically stacked, and means for moving tubes to be heated vertically in front of the unit, the unit as a whole provided for reciprocating moving in a second horizontal direction, transverse to said first direction.

* * * * *